US012626153B2

(12) United States Patent
Shirakata et al.

(10) Patent No.: US 12,626,153 B2
(45) Date of Patent: May 12, 2026

(54) LEARNING APPARATUS, LEARNING METHOD, AND FAILURE PREDICTION SYSTEM

(71) Applicant: Panasonic Intellectual Property Management Co., Ltd., Osaka (JP)

(72) Inventors: Naganori Shirakata, Kanagawa (JP); Zhiqi Liu, Osaka (JP); Tenta Komatsu, Osaka (JP); Takayuki Tsukizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 585 days.

(21) Appl. No.: 18/324,051

(22) Filed: May 25, 2023

(65) Prior Publication Data

US 2023/0297854 A1 Sep. 21, 2023

Related U.S. Application Data

(63) Continuation of application No. PCT/JP2021/034599, filed on Sep. 21, 2021.

(30) Foreign Application Priority Data

Nov. 30, 2020 (JP) ................................. 2020-198545

(51) Int. Cl.
*G06N 5/022* (2023.01)
(52) U.S. Cl.
CPC .................................... *G06N 5/022* (2013.01)
(58) Field of Classification Search
CPC ....... G06N 5/022; G06N 20/00; G01M 99/00; G05B 23/02
See application file for complete search history.

(56) References Cited

U.S. PATENT DOCUMENTS 6,502,085 B1 * 12/2002 Adibhatla ............. G01M 15/00
706/20
6,513,025 B1 * 1/2003 Rosen .................... G06N 5/025
706/45

(Continued)

FOREIGN PATENT DOCUMENTS

CN 111458142 A 7/2020
JP 2017033526 A 2/2017

(Continued)

OTHER PUBLICATIONS

International Search Report, mailed Nov. 22, 2021, for International Patent Application No. PCT/JP2021/034599. (5 pages) (with English Translation).

*Primary Examiner* — Bhavesh V Amin
(74) *Attorney, Agent, or Firm* — Seed Intellectual Property Law Group LLP

(57) ABSTRACT

The learning apparatus according to one exemplary embodiment includes: a pattern extractor that extracts a time fluctuation pattern of an amplitude of a feature frequency from state observation signal data up to a first time point, the state observation signal data indicating an operation state of equipment, the feature frequency being associated with a part of the equipment; a training data generator that generates, based on the time fluctuation pattern of the amplitude of the feature frequency, simulated state observation signal data representing the time fluctuation pattern of the amplitude of the feature frequency at and after the first time point, and generates training data including the simulated state observation signal data; and a learner that generates a classification model for determination of a failure state of the part of the equipment using the training data.

10 Claims, 9 Drawing Sheets

(56) References Cited

U.S. PATENT DOCUMENTS

| | | | |
|---|---|---|---|
| 9,792,656 B1* | 10/2017 | Konrardy | G06Q 40/08 |
| 10,088,984 B2* | 10/2018 | Plummer | G06N 20/00 |
| 10,147,320 B1* | 12/2018 | Ellis | G01S 17/931 |
| 10,296,848 B1* | 5/2019 | Mars | G06F 18/217 |
| 10,317,853 B2* | 6/2019 | Inagaki | G05B 13/0265 |
| 10,586,176 B2* | 3/2020 | Barker | G06N 20/00 |
| 10,684,608 B2* | 6/2020 | Tanaka | G05B 19/4065 |
| 10,719,781 B2* | 7/2020 | Fink | G06N 5/022 |
| 11,216,757 B2* | 1/2022 | Shiraishi | G06Q 10/063114 |
| 11,275,345 B2* | 3/2022 | Inagaki | G05B 13/0265 |
| 11,341,398 B2* | 5/2022 | Toba | G06N 3/063 |
| 11,410,050 B2* | 8/2022 | Baker | G06N 3/088 |
| 11,433,539 B2* | 9/2022 | Kobayashi | G05B 19/4155 |
| 11,531,876 B2* | 12/2022 | Wu | G06N 3/08 |
| 11,593,712 B2* | 2/2023 | Webster | G06F 3/0485 |
| 11,631,012 B2* | 4/2023 | Khatami | G06N 3/09 |
| | | | 706/12 |
| 12,072,341 B2* | 8/2024 | Heinemann | G01N 35/00693 |
| 12,175,365 B2* | 12/2024 | Yaguchi | G06N 3/0495 |
| 2001/0039481 A1* | 11/2001 | Tremblay | H01M 8/04552 |
| | | | 702/35 |
| 2003/0149547 A1* | 8/2003 | Nakao | G05B 23/024 |
| | | | 702/183 |
| 2007/0136220 A1* | 6/2007 | Sakurai | G06N 20/00 |
| | | | 706/20 |
| 2007/0156620 A1* | 7/2007 | Hartman | G05B 23/0272 |
| | | | 706/47 |
| 2010/0057649 A1* | 3/2010 | Lee | H04L 41/16 |
| | | | 709/224 |
| 2010/0318837 A1* | 12/2010 | Murphy | G06F 11/1461 |
| | | | 714/E11.125 |
| 2011/0093365 A1* | 4/2011 | Tiano | G06Q 10/08 |
| | | | 705/28 |
| 2012/0185728 A1* | 7/2012 | Guo | F24F 11/38 |
| | | | 714/E11.159 |
| 2014/0365195 A1* | 12/2014 | Lahiri | G05B 23/024 |
| | | | 703/12 |
| 2015/0154062 A1* | 6/2015 | Watanabe | G06F 11/0727 |
| | | | 714/26 |
| 2016/0203036 A1* | 7/2016 | Mezic | G06F 11/0751 |
| | | | 714/819 |
| 2017/0124486 A1* | 5/2017 | Chan | G06F 16/248 |
| 2017/0293862 A1* | 10/2017 | Kamiya | G06N 20/00 |
| 2017/0344909 A1* | 11/2017 | Kurokawa | G05B 23/024 |
| 2018/0075354 A1* | 3/2018 | Averboch | G06N 20/00 |
| 2018/0089271 A1* | 3/2018 | Kosuru | G06N 20/00 |
| 2018/0144269 A1* | 5/2018 | Wilson | G06N 5/022 |
| 2018/0164781 A1* | 6/2018 | Kubo | G05B 19/4083 |
| 2018/0315260 A1* | 11/2018 | Anthony | G06N 5/022 |
| 2019/0026632 A1* | 1/2019 | Natsumeda | G06N 5/022 |
| 2019/0034803 A1* | 1/2019 | Gotou | G06N 3/088 |
| 2019/0122099 A1* | 4/2019 | Dung | G06N 3/08 |
| 2019/0129398 A1* | 5/2019 | Naito | G05B 13/027 |
| 2019/0137969 A1* | 5/2019 | Watanabe | G05B 19/4063 |
| 2019/0137985 A1* | 5/2019 | Cella | G05B 19/4185 |
| 2019/0146478 A1* | 5/2019 | Cella | G05B 19/4183 |
| | | | 702/188 |
| 2019/0155924 A1* | 5/2019 | Guggilla | G06F 16/211 |
| 2019/0164015 A1* | 5/2019 | Jones, Jr. | G06N 5/022 |
| 2019/0236458 A1* | 8/2019 | Taylor | G06N 3/006 |
| 2019/0244127 A1* | 8/2019 | Amado | A63F 9/24 |
| 2019/0258223 A1* | 8/2019 | Oota | B25J 9/1674 |
| 2019/0325312 A1* | 10/2019 | Matsuo | G06Q 10/1091 |
| 2020/0050896 A1* | 2/2020 | Jayaraman | G06F 18/211 |
| 2020/0081445 A1* | 3/2020 | Stetson | G05D 1/0221 |
| 2020/0193325 A1* | 6/2020 | Natsumeda | G06N 20/00 |
| 2020/0210924 A1* | 7/2020 | Ghosh | G06N 5/022 |
| 2020/0225655 A1* | 7/2020 | Cella | G05B 19/4184 |
| 2020/0234179 A1* | 7/2020 | Lore | G06N 20/00 |
| 2020/0234180 A1* | 7/2020 | Sheikh | G06N 20/00 |
| 2020/0348662 A1* | 11/2020 | Cella | G05B 23/0294 |
| 2021/0014102 A1* | 1/2021 | Singh | H04L 41/142 |
| 2021/0157312 A1* | 5/2021 | Cella | G06Q 30/06 |
| 2021/0169417 A1* | 6/2021 | Burton | A61B 5/4815 |
| 2021/0295151 A1* | 9/2021 | Yoo | G06V 10/764 |
| 2021/0374580 A1* | 12/2021 | Hayes | G06F 21/56 |
| 2021/0383224 A1* | 12/2021 | Chen | G06N 3/08 |
| 2022/0063658 A1* | 3/2022 | Yokoyama | G06N 3/09 |
| 2022/0083046 A1* | 3/2022 | Cella | G05B 23/0294 |
| 2022/0083047 A1* | 3/2022 | Cella | G05B 23/0294 |
| 2022/0083048 A1* | 3/2022 | Cella | G05B 23/0294 |
| 2022/0108262 A1* | 4/2022 | Cella | G05B 17/02 |
| 2022/0121194 A1* | 4/2022 | Pritchard | G05B 23/024 |
| 2022/0163959 A1* | 5/2022 | Cella | G06Q 30/06 |
| 2022/0163960 A1* | 5/2022 | Cella | G06Q 30/06 |
| 2022/0188647 A1* | 6/2022 | Tajiri | G06N 3/088 |
| 2022/0309407 A1* | 9/2022 | Ramirez | G06F 8/60 |
| 2022/0413839 A1* | 12/2022 | Zhang | G06F 40/284 |
| 2022/0414465 A1* | 12/2022 | Toizumi | G06N 3/08 |
| 2023/0089205 A1* | 3/2023 | Cella | G06Q 30/06 |
| | | | 702/188 |
| 2023/0092066 A1* | 3/2023 | Cella | G06Q 30/06 |
| | | | 702/188 |
| 2023/0098519 A1* | 3/2023 | Cella | G06Q 30/06 |
| | | | 702/188 |
| 2023/0111071 A1* | 4/2023 | Cella | G06Q 30/06 |
| | | | 702/188 |
| 2023/0118209 A1* | 4/2023 | Saisho | G06N 3/047 |
| | | | 707/737 |
| 2023/0126258 A1* | 4/2023 | Kikuchi | G06N 20/00 |
| | | | 706/12 |
| 2023/0132739 A1* | 5/2023 | Anglin | G06N 20/00 |
| | | | 706/12 |
| 2023/0135882 A1* | 5/2023 | Cella | G06Q 30/06 |
| | | | 702/188 |
| 2023/0176550 A1* | 6/2023 | Cella | G05B 23/0243 |
| | | | 700/117 |
| 2023/0176557 A1* | 6/2023 | Cella | G05B 13/048 |
| | | | 700/117 |
| 2023/0186200 A1* | 6/2023 | Cella | G01N 29/14 |
| 2023/0186201 A1* | 6/2023 | Cella | G05B 19/0426 |
| | | | 705/7.17 |
| 2023/0195058 A1* | 6/2023 | Cella | G05B 19/4188 |
| | | | 700/43 |
| 2023/0196229 A1* | 6/2023 | Cella | G05B 19/0426 |
| | | | 705/7.17 |
| 2023/0196230 A1* | 6/2023 | Cella | G06V 10/82 |
| | | | 705/7.17 |
| 2023/0196231 A1* | 6/2023 | Cella | G05B 19/0426 |
| | | | 705/7.17 |
| 2023/0206055 A1* | 6/2023 | Tetelman | G06N 3/088 |
| | | | 706/15 |
| 2023/0214666 A1* | 7/2023 | Tsuchida | G06N 3/045 |
| | | | 706/15 |
| 2023/0214719 A1* | 7/2023 | Woo | G06N 20/00 |
| | | | 706/12 |
| 2023/0222324 A1* | 7/2023 | Iwata | G06N 3/0464 |
| | | | 706/15 |
| 2023/0232187 A1* | 7/2023 | Al-Qutami | H04W 4/33 |
| | | | 455/456.1 |
| 2023/0244758 A1* | 8/2023 | Green | G06F 18/2148 |
| | | | 706/10 |
| 2023/0281527 A1* | 9/2023 | Cella | G06V 20/17 |
| | | | 705/7.17 |
| 2023/0297854 A1* | 9/2023 | Shirakata | G05B 23/02 |
| | | | 706/12 |
| 2023/0326191 A1* | 10/2023 | Li | G06N 20/20 |
| | | | 382/155 |
| 2023/0334843 A1* | 10/2023 | Fujita | G06V 10/82 |
| 2023/0359931 A1* | 11/2023 | Teranishi | G06N 3/08 |
| 2023/0368026 A1* | 11/2023 | Cox | G06N 3/006 |
| 2023/0401274 A1* | 12/2023 | Denninghoff | G06Q 30/0251 |
| 2024/0028902 A1* | 1/2024 | Rodriguez Mulet | G06N 3/044 |
| 2024/0037407 A1* | 2/2024 | Sato | G06N 3/09 |
| 2024/0054358 A1* | 2/2024 | Ferreira Costa | G06N 7/01 |
| 2024/0070251 A1* | 2/2024 | Maizels | G06F 21/32 |
| 2024/0073219 A1* | 2/2024 | Maizels | G10L 13/00 |
| 2024/0127116 A1* | 4/2024 | Teranishi | G06N 20/00 |
| 2024/0169262 A1* | 5/2024 | Shibata | G06N 3/063 |
| 2024/0256943 A1* | 8/2024 | Phan | G06N 20/10 |
| 2024/0257926 A1* | 8/2024 | Langel | G16H 10/20 |

(56)  References Cited

U.S. PATENT DOCUMENTS

| | | | |
|---|---|---|---|
| 2024/0273387 A1* | 8/2024 | Baker | G06N 5/04 |
| 2024/0403720 A1* | 12/2024 | Kheiri | G06N 5/022 |
| 2025/0013209 A1* | 1/2025 | Khare | G05B 13/0265 |
| 2025/0048088 A1* | 2/2025 | Kolekar | H04W 12/02 |
| 2025/0111279 A1* | 4/2025 | Kim | G06N 20/00 |
| 2025/0119355 A1* | 4/2025 | Takasaki | G06N 20/00 |
| 2025/0254532 A1* | 8/2025 | Shrivastava | H04W 24/02 |
| 2025/0266043 A1* | 8/2025 | Maizels | G10L 25/84 |
| 2025/0279100 A1* | 9/2025 | Maizels | G06V 40/20 |
| 2025/0322969 A1* | 10/2025 | Brilliant | G16H 40/20 |
| 2025/0328781 A1* | 10/2025 | Brilliant | G06N 5/022 |
| 2025/0328818 A1* | 10/2025 | Brilliant | G06N 20/00 |
| 2025/0328974 A1* | 10/2025 | Brilliant | G06N 20/00 |
| 2025/0348566 A1* | 11/2025 | Xu | G06F 21/552 |

FOREIGN PATENT DOCUMENTS

| | | | |
|---|---|---|---|
| JP | 6148316 B2 | 6/2017 |
| JP | 6603192 B2 | 11/2019 |

* cited by examiner

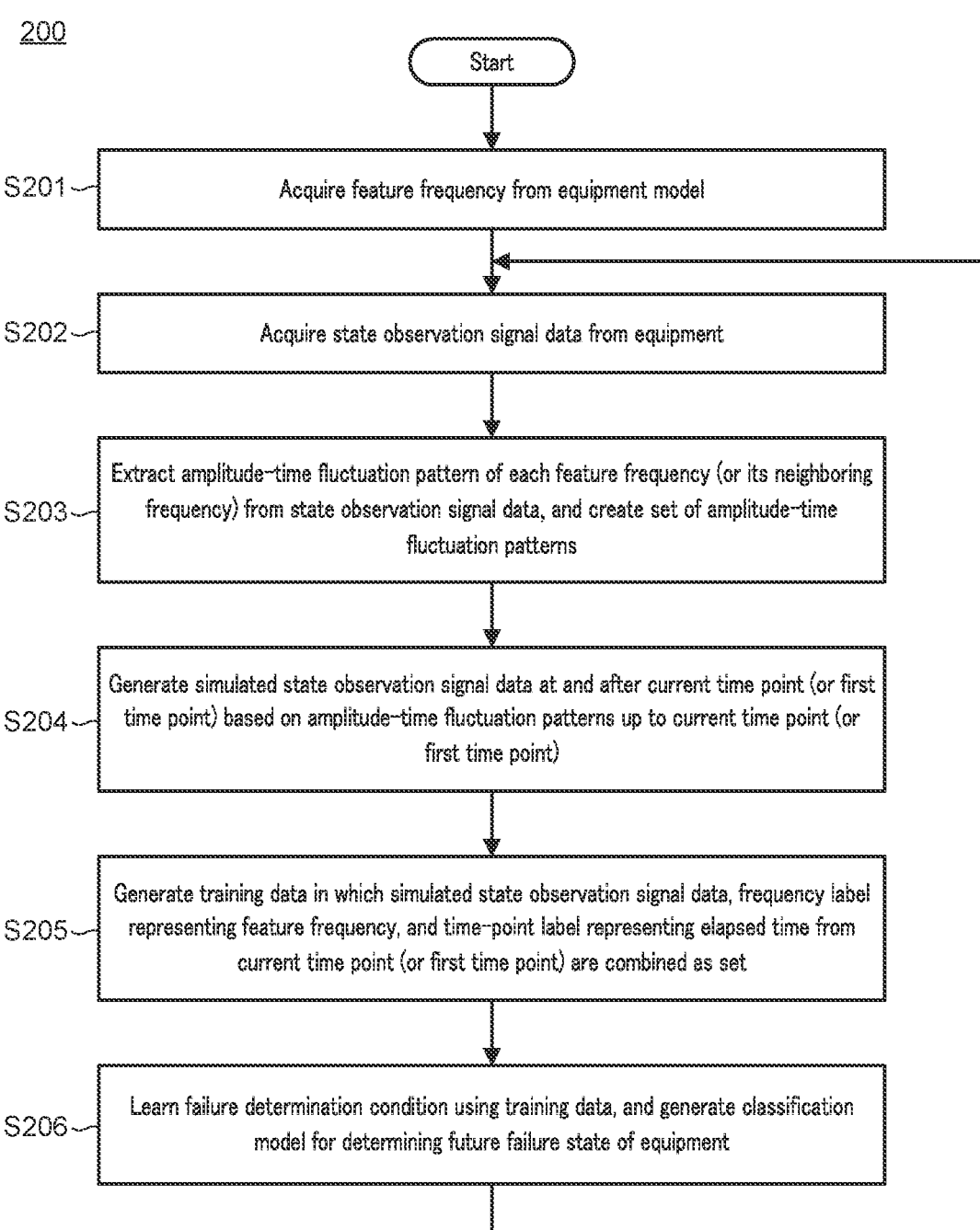

200

Start

S201 — Acquire feature frequency from equipment model

S202 — Acquire state observation signal data from equipment

S203 — Extract amplitude–time fluctuation pattern of each feature frequency (or its neighboring frequency) from state observation signal data, and create set of amplitude–time fluctuation patterns S204 — Generate simulated state observation signal data at and after current time point (or first time point) based on amplitude–time fluctuation patterns up to current time point (or first time point)

S205 — Generate training data in which simulated state observation signal data, frequency label representing feature frequency, and time–point label representing elapsed time from current time point (or first time point) are combined as set S206 — Learn failure determination condition using training data, and generate classification model for determining future failure state of equipment

Start

S801 — Acquire state observation signal data from equipment

S802 — Classify state observation signal data according to classification model

S803 — Determine failure state of part of equipment

S804 — Display determination result of failure state

LEARNING APPARATUS, LEARNING METHOD, AND FAILURE PREDICTION SYSTEM

TECHNICAL FIELD

The present disclosure relates to a learning apparatus, a learning method, and a failure prediction system.

BACKGROUND ART

A large number of motors, gears, and the like are used in industrial equipment, industrial machinery, industrial robots, and the like for performing production in factories and the like. Abnormalities in apparatuses due to aging degradation and wear degradation, as well as sudden device troubles, lead to line stoppage, and there is a concern that productivity may decrease and/or accidents may occur.

Therefore, there is an increasing demand for a failure prediction system that monitors the state of equipment including these apparatuses and devices and supports efficient planned maintenance according to the state of the equipment.

In connection with such a failure prediction system, Patent Literature (hereinafter, referred to as "PTL") 1 discloses a technique of learning conditions associated with a failure of an industrial machine according to a training data set created based on a combination of a state variable including sensor data reflecting a state of the industrial machine and determination data resulting from determination of a degree of the failure of the industrial machine. By learning by supervised learning using training data (learning data) as described above, the accuracy of prediction of the failure of the equipment is improved as compared with learning by unsupervised learning that does not use training data.

CITATION LIST

Patent Literature

PTL 1
Japanese Patent Application Laid-Open No. 2017-033526

SUMMARY OF INVENTION

However, for individual motors, gears, and the like in apparatuses having entirely different operating conditions and/or entirely different configurations, it is difficult to collect, from operating equipment, training data consisting of a combination of state variables and a plurality of failure states. For example, it is practically difficult to collect a large amount of data indicating a state in which a motor, a gear, or the like is actually in an abnormal state or a failure state (hereinafter, the abnormal and failure states are collectively referred to as "failure state"). For this reason, a method for predicting the failure state by performing learning of the normal state by unsupervised learning and detecting a deviation from the normal state is often used in practice.

As described above, for the learning for predicting or determining the failure state of the equipment by the supervised learning, there is room for examination in terms of the accuracy of the prediction or determination.

One non-limiting and exemplary embodiment of the present disclosure facilitates providing a learning apparatus, a learning method, and a failure prediction system that easily acquire data clearly indicating a failure state used as training data in the supervised learning, and perform learning for accurately determining the failure state of equipment.

A learning apparatus according to one exemplary embodiment of the present disclosure includes: a pattern extractor that extracts a time fluctuation pattern of an amplitude of a feature frequency from state observation signal data up to a first time point, the state observation signal data indicating an operation state of equipment, the feature frequency being associated with a part of the equipment; a training data generator that generates, based on the time fluctuation pattern of the amplitude of the feature frequency, simulated state observation signal data representing the time fluctuation pattern of the amplitude of the feature frequency at and after the first time point, and generates training data including the simulated state observation signal data; and a learner that generates a classification model for determination of a failure state of the part of the equipment using the training data.

A learning method according to one exemplary embodiment of the present disclosure is performed by a learning apparatus and includes steps performed by the learning apparatus of: extracting a time fluctuation pattern of an amplitude of a feature frequency from state observation signal data up to a first time point, the state observation signal data indicating an operation state of equipment, the feature frequency being associated with a part of the equipment; generating, based on the time fluctuation pattern of the amplitude of the feature frequency, simulated state observation signal data representing the time fluctuation pattern of the amplitude of the feature frequency at and after the first time point; generating training data including the simulated state observation signal data; and generating a classification model for determination of a failure state of the part of the equipment using the training data.

A failure prediction system according to one exemplary embodiment of the present disclosure includes: the above-described learning apparatus; and a state determiner that determines the failure state of the part of the equipment using current state observation signal data indicating a current operation state of the equipment and the classification model.

It should be noted that general or specific embodiments may be implemented as a system, a method, an integrated circuit, a computer program, a storage medium, or any selective combination thereof.

According to one exemplary embodiment of the present disclosure, it is possible to easily acquire data clearly indicating a failure state used as training data in the supervised learning, and perform learning for accurately determining the failure state of equipment.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a flowchart illustrating one example of a learning method according to the embodiment of the present disclosure;

DESCRIPTION OF EMBODIMENTS

Figure 1:
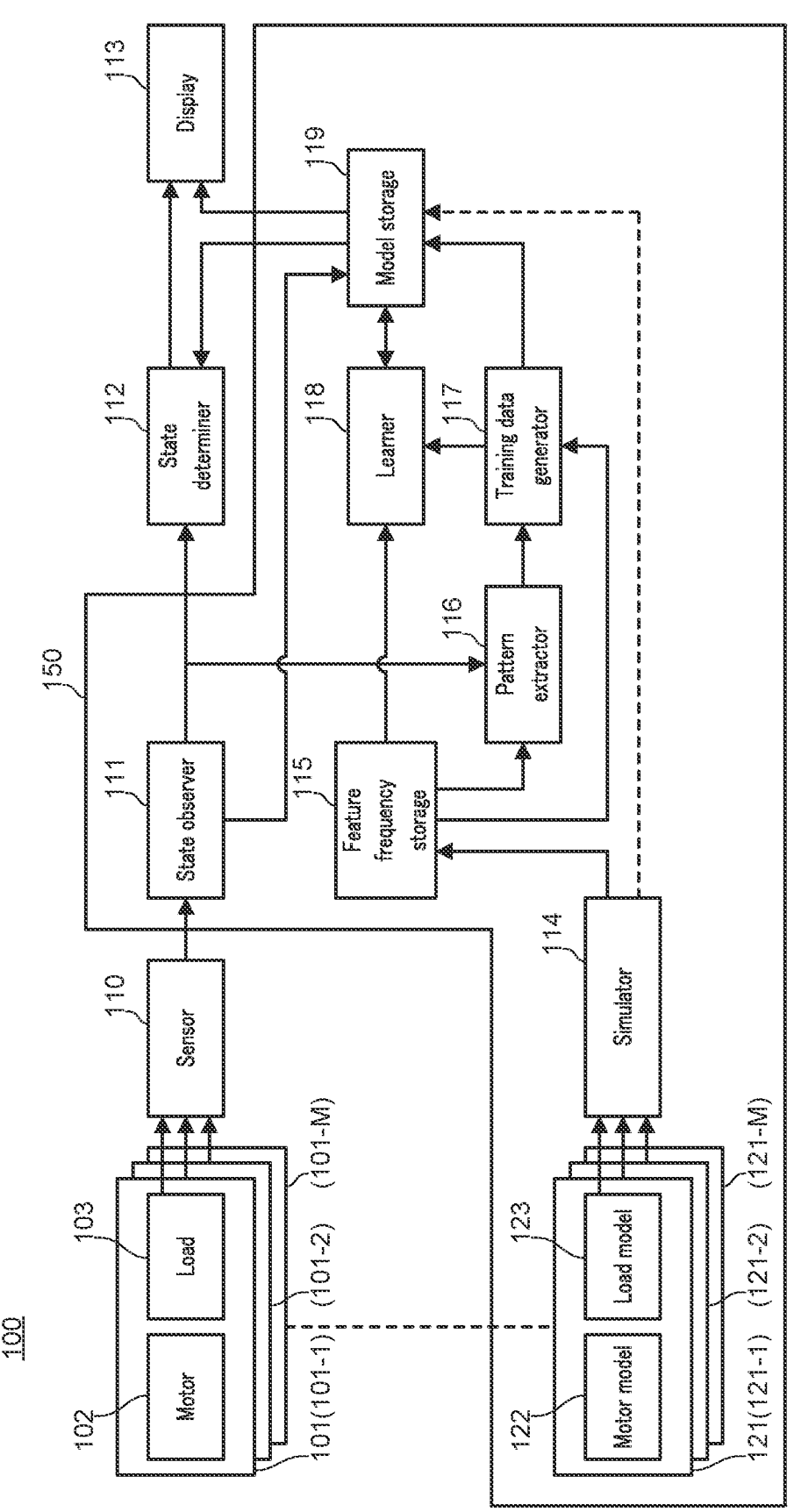
FIG. 1 is a block diagram illustrating one example of a failure prediction system according to an embodiment of the present disclosure.

Embodiments of the present disclosure will be described in detail below with appropriate reference to the accompanying drawings. However, any unnecessarily detailed description may be omitted. For example, any detailed description of well-known matters and redundant descriptions on substantially the same configurations may be omitted. This is to avoid the unnecessary redundancy of the following description and to facilitate understanding of those skilled in the art.

It is to be noted that the accompanying drawings and the following description are provided to enable those skilled in the art to fully understand this disclosure, and are not intended to limit the claimed subject.

EMBODIMENT

<Failure Prediction System>

To begin with, failure prediction system 100 according to an embodiment of the present disclosure will be described with reference to FIG. 1. Failure prediction system 100 monitors equipment in a factory or the like, performs machine learning based on data indicating past states of equipment and a result obtained by simulation, and generates (builds) a classification model for determining a future failure state of the equipment. In addition, failure prediction system 100 determines the future failure state of the equipment using data indicating current states of the equipment and the generated classification model, and presents, to the user, the determination result resulting from determination.

Failure prediction system 100 includes monitoring target equipment 101, sensor 110, learning apparatus 150, state determiner 112, and display 113. At least some of these functional sections are capable of communicating with each other via, for example, a communication network (a wireless network, a wired network, or a combination of the wireless network and the wired network).

Equipment 101 includes motor 102 and load 103. Load 103 represents a gearbox, a mechanism, and the like driven by motor 102. Note that a plurality of pieces of equipment 101 may exist. In that case, pieces of equipment 101-1 to 101-M (M is an integer greater than or equal to 2) include motors 102-1 to 102-M and loads 103-1 to 103-M, respectively.

Sensor 110 is connected or attached to the motor, load, or the like of each equipment 101-1 to 101-M. Sensor 110 senses (measures) the state of the equipment over time (e.g., every other minute, every five minutes, every thirty minutes, or every hour) to generate a sensing signal indicative of the sensed state of the equipment. Then, sensor 110 outputs the generated sensing signal to learning apparatus 150. Although one sensor 110 is illustrated in FIG. 1, a plurality of sensors may be present. For example, various sensors such as a current sensor for measuring a power supply current of the motor, a harmonic sensor, a torque sensor for measuring a torque of the motor, an acceleration sensor and a vibration sensor for measuring vibration of the equipment, and the like can be used as sensor 110. These sensors may also be used in combination.

Learning apparatus 150 receives, as an input, the sensing signal output from sensor 110. Learning apparatus 150 performs machine learning based on the received sensing signal and the result obtained by the simulation, and generates the classification model for determining the state of the equipment (more specifically, the future failure state of the equipment). Further, learning apparatus 150 outputs, to state determiner 112, state observation signal data generated by preprocessing the sensing signal input from sensor 110. Learning apparatus 150 will be described in detail later.

State determiner 112 determines the state of the equipment using the classification model, the state observation signal data, and training data generated by learning apparatus 150. Specifically, state determiner 112 detects a feature indicated by the state observation signal data (an amplitude of a feature frequency to be described later), and determines the state of the equipment using the classification model, the training data, and the detected feature. Examples of such a state of the equipment include "normal," "degraded," "abnormal," "sign of failure," "failure," and "associated part in equipment," and the like. In the present embodiment, in particular, state determiner 112 determines the future failure state of the equipment using the classification model, the training data, and the detected feature. In addition, state determiner 112 outputs, to display 113, the determination result resulting from determination.

Display 113 receives, as an input, the determination result output from state determiner 112, and displays the received determination result to the user. For example, a user interface such as a display with a touch panel can be used as display 113. The user can judge the state of the equipment through display 113 and judge a part where maintenance or repair of the equipment is to be performed.

<Learning Apparatus>

Next, with continuing reference to FIG. 1, learning apparatus 150 included in failure prediction system 100 will be described.

Learning apparatus 150 includes state observer 111, simulator 114, feature frequency storage 115, pattern extractor 116, training data generator 117, learner 118, model storage 119, and equipment model 121.

State observer 111 receives, as an input, the sensing signal output from sensor 110, performs preprocessing on the received sensing signal, and generates (acquires) the state observation signal data indicating an operation state of the equipment in operation. The preprocessing on the sensing signal includes, for example, filtering, noise removal, moving averaging, Fourier transform, transforms into frequency spectra by Wavelet transform, and the like. For example, state observer 111 outputs, as the state observation signal data, data in the frequency domain obtained by performing Fourier transform on time-series sensing data from a current sensor that detects a power supply current of the motor in a predetermined time window. Alternatively, state observer 111 may output, as the state observation signal data, data obtained by taking, in a predetermined time window, a moving average of the sensing data from a harmonic sensor that directly detects a harmonic component of the power supply current of the motor.

Then, state observer 111 outputs the generated state observation signal data to state determiner 112 and pattern extractor 116, and stores the state observation signal data in model storage 119. State observer 111 outputs the state observation signal data to pattern extractor 116 for prior learning until a classification model to be described later is generated.

Simulator 114 simulates the operation of equipment 101 corresponding to equipment model 121 by causing equipment model 121 to perform a simulative operation. Simulator 114 generates (acquires) simulated state observation signal data that simulatively indicates the operation state of the equipment model in the simulative operation. The simulated state observation signal data includes a feature frequency for each structure of equipment described later. Here, as will be described later, it is found that each part of the equipment and the feature frequency are closely related to each other.

In addition, simulator 114 stores, in feature frequency storage 115, the feature frequencies of respective structures of the equipment in the generated simulated state observation signal data such that the feature frequencies are associated with the respective parts of the equipment. The simulated state observation signal data generated by simulator 114 may be used as input data for the training data to be generated by training data generator 117. Therefore, simulator 114 may store the generated simulated state observation signal data in model storage 119 for use by training data generator 117.

Feature frequency storage 115 stores the feature frequencies for the respective structures of the equipment generated by simulator 114 in association with the respective parts of each equipment. Although FIG. 1 illustrates an example in which feature frequency storage 115 exists inside learning apparatus 150, the present embodiment is not limited to this, and feature frequency storage 115 may exist outside learning apparatus 150 and inside failure prediction system 100.

Pattern extractor 116 receives, as an input, the state observation signal data output from state observer 111. Pattern extractor 116 extracts a time fluctuation pattern from the received state observation signal data. For example, such a time fluctuation pattern includes a time fluctuation pattern of signal amplitude, a time fluctuation pattern of signal amplitude in a specific frequency band, and the like. For example, various patterns such as a linear approximation, an n-th curve approximation, and an exponential approximation can be used as the time fluctuation patterns.

Pattern extractor 116 acquires the feature frequency from feature frequency storage 115. Pattern extractor 116 extracts amplitude-time fluctuation patterns with respect to the feature frequencies for each equipment by using the acquired feature frequencies, thereby creating a set of amplitude-time fluctuation patterns extracted from the equipment. Then, pattern extractor 116 outputs the created set of amplitude-time fluctuation patterns to training data generator 117.

Training data generator 117 receives, as an input, the set of amplitude-time fluctuation patterns output from pattern extractor 116. Training data generator 117 acquires the feature frequencies from feature frequency storage 115. By using the received set of time fluctuation patterns and the acquired feature frequencies, training data generator 117 generates training data used for machine learning by learner 118. Specifically, the training data is data in which the input data, which is the simulated state observation signal data that simulatively indicates the operation state of the equipment at and after the current time point (during learning) (or a specific time point or a first time point) and that is generated by the simulation, a frequency label (or an equipment part label) representing the feature frequency associated with a virtual failure part of the equipment, and a time point label representing the elapsed time since the current time point (or the specific time point or the first time point) are combined as a set.

Here, the "virtual failure part" means an equipment part where a failure would occur in the future. Training data generator 117 generates by simulation a large number of and a variety of sets of training data described above. Then, training data generator 117 stores the generated training data in model storage 119, and also notifies learner 118 that the training data has been generated and stored in model storage 119.

Upon receiving the notification from training data generator 117, learner 118 acquires the feature frequencies and the training data from feature frequency storage 115 and model storage 119, respectively. Using the acquired feature frequencies and the training data, learner 118 conducts machine learning on the features (amplitude-time fluctuation patterns of the feature frequencies) indicated by the simulated state observation signal data, which are associated with states of the equipment to be determined by state determiner 112 (in particular, a future failure state of the equipment).

In such machine learning, for example, various known algorithms such as deep learning by a neural network or the like, support vector machine, random forest, and ensemble learning in which these are combined can be used. Further, learner 118 generates a classification model for determining a future failure state of the equipment by performing machine learning as described above. Then, learner 118 stores the generated classification model in model storage 119. As described above, by performing machine learning using the training data generated by training data generator 117, learner 118 is capable of characterizing the relationship between the simulated state observation signal data and the states of the equipment (in particular, a failure state), and classifying the states of the equipment in the simulated state observation signal data.

Model storage 119 stores the state observation signal data generated by state observer 111, the simulated state observation signal data generated by simulator 114, the training data generated by training data generator 117, and the classification model generated by learner 118. Although FIG. 1 illustrates an example in which model storage 119 exists inside learning apparatus 150, the present embodiment is not limited to this, and model storage 119 may exist outside learning apparatus 150 and inside failure prediction system 100 (the inside of failure prediction system 100 includes the inside of state determiner 112).

The state observation signal data generated by state observer 111 may be stored in a state observation signal data storage (not illustrated) separate from model storage 119. The simulated state observation signal data generated by simulator 114 may be stored in a simulated state observation signal data storage (not illustrated) separate from model storage 119. The training data generated by training data generator 117 may be stored in a training data storage (not illustrated) separate from model storage 119. State determiner 112 refers to model storage 119 when performing the above determination. Display 113 refers to model storage 119 when performing the above-described display.

Equipment model 121 models equipment 101. Equipment model 121 includes motor model 122 modeling motor 102 and load model 123 modeling load 103. When there are a plurality of pieces of equipment, equipment models 121-1 to 121-M corresponding to the plurality of pieces of equipment 101-1 to 101-M include motor models 122 modeling motors and load models 123 loads, respectively. Such modeling can be performed in various levels of detail, and 1-D to 3-D models can be used, the 1-D model representing operations by using approximate expressions, the 3-D model reproducing, for example, shapes, masses, materials, and/or electromagnetic circuitry, so as to simulate, for example, electromagnetic or mechanical operations.

<Learning Method>

Next, one example of learning method 200 according to the embodiment of the present disclosure will be described with reference to FIGS. 2 to 7. In FIG. 2, learning method 200 is executed by learning apparatus 150.

In step S201, training data generator 117 acquires at least one feature frequency for each equipment from each equipment model via simulator 114 and feature frequency storage 115.

In step S202, state observer 111 receives a sensing signal from sensor 110 sensing the state of the equipment, and performs the above-described preprocessing on the sensing signal to generate state observation signal data indicating the operation state of the equipment in operation. In step S202, state observer 111 may acquire, from the equipment via sensor 110, the state observation signal data indicating the operation state of the equipment in operation. Then, state observer 111 outputs the acquired state observation signal data to pattern extractor 116.

In step S203, pattern extractor 116 acquires feature frequencies from feature frequency storage 115, and uses the acquired feature frequencies to extract the amplitude-time fluctuation pattern of each feature frequency or its neighboring frequency (hereinafter, collectively referred to as "feature frequency") for each equipment from a past history of the state observation signal data outputted from state observer 111. In addition, in step S203, pattern extractor 116 creates a set of amplitude-time fluctuation patterns extracted for each equipment. Then, pattern extractor 116 outputs the created set of amplitude-time fluctuation patterns to training data generator 117.

In step S204, training data generator 117 generates, by simulation, simulated state observation signal data that simulatively indicates the operation state of the equipment at and after the current time point (or the specific time point or the first time point) based on the amplitude-time fluctuation patterns of respective feature frequencies associated with respective parts of each equipment up to the current time point (or the specific time point or the first time point). Specifically, training data generator 117 generates the simulated state observation signal data with various combinations by applying, to any feature frequency for each equipment, extrapolation of any amplitude-time fluctuation pattern selected from the set of amplitude-time fluctuation patterns. Therefore, the simulated state observation signal data represents the amplitude-time fluctuation patterns of respective feature frequencies associated with respective parts of each equipment as generated by simulation at and after a specific time point (first time point).

In step S205, training data generator 117 generates training data in which input data that is the generated simulated state observation signal data, a frequency label that is associated with a part of the equipment and represents the feature frequency to which the amplitude-time fluctuation pattern is applied, and a time point label that represents an elapsed time from the current time point (or the specified time point or the first time point) are combined as a set.

In step S206, learner 118 learns a failure determination condition using the training data in which the simulated state observation signal data, the frequency label, and the time point label are combined as a set, and generates a classification model for determining the future failure state of the equipment.

Next, learning method 200 returns from step S206 to step S202, and learning apparatus 150 repeatedly performs the steps of from S202 to S206 to generate the training data while updating the amplitude-time fluctuation patterns from the current time point, to continuously perform learning.

Next, referring to FIG. 3, an exemplary equipment harmonic ("feature frequency" for each equipment) in the embodiment of the present disclosure will be described in relation to step S201 of FIG. 2.

Figure 3:
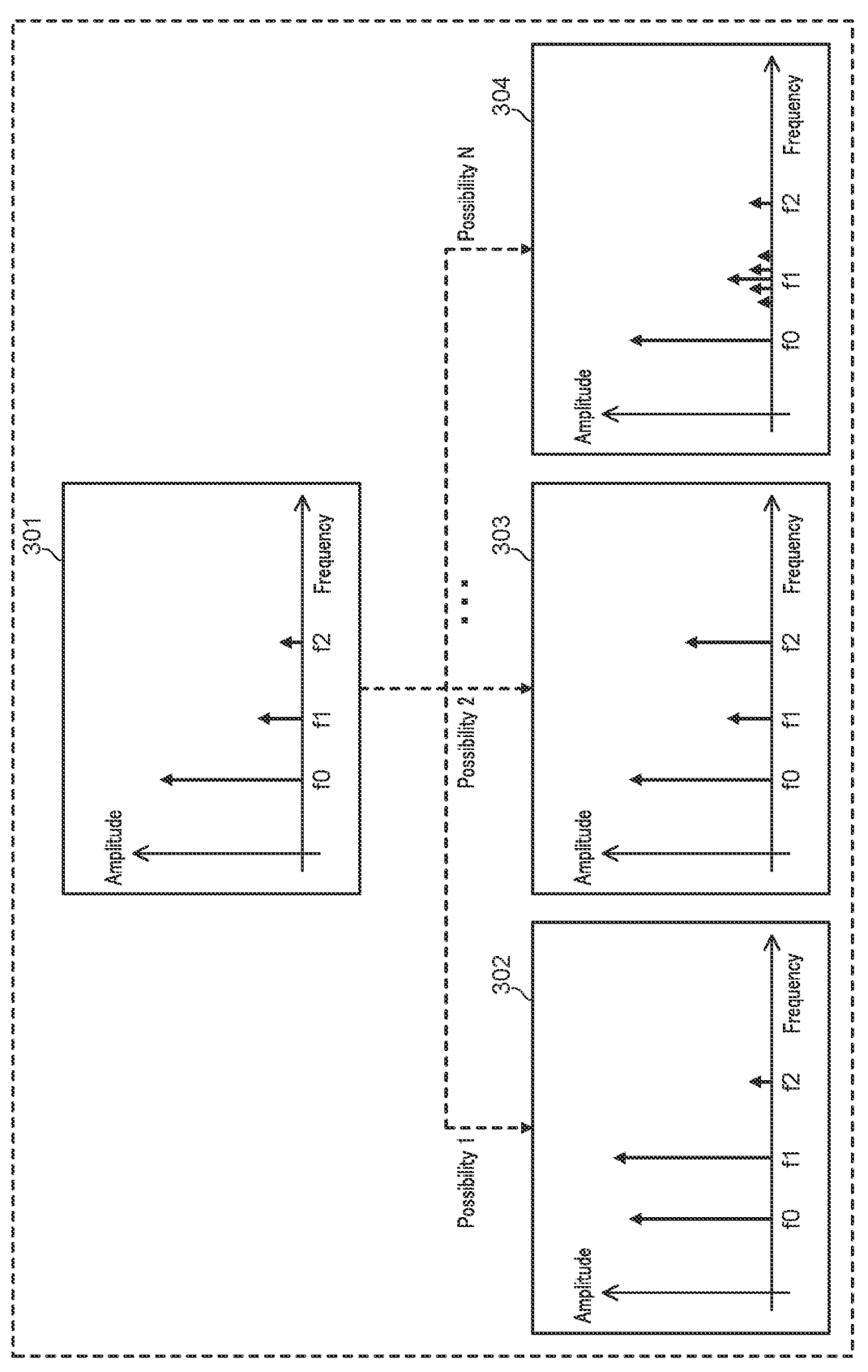
FIG. 3 illustrates an example of an equipment harmonic in the embodiment of the present disclosure.

In FIG. 3, state observation signal data 301 indicates signal data for a normal state in which motor 102 of equipment 101 is operating normally. On the other hand, state observation signal data 302 to 304 indicate signal data for failure states in which failures occur at different parts of the same motor of the same equipment. Note that state observation signal data 302 to 304 may indicate the possibilities of fluctuation of the state observation signal data at a time of occurrence of a failure. State observation signal data 301 to 304 are signal data generated by state observer 111 performing frequency analysis on the sensing signal from sensor 110 by Fourier transform.

Here, it has been found that when a failure occurs at these parts, fluctuation occurs in feature frequencies associated with these parts.

In FIG. 3, state observation signal data 301 for the normal state shows that harmonic components are generated at least at feature frequencies f0, f1, and f2 of respective pieces of equipment. These frequencies depend on the structures of the motors and the loads. Regarding the motors, for example, the number of revolutions, the power supply frequency, the configuration of a motor rotor, the number of slots of a stator, the number of poles of the stator are related to these frequencies, and regarding the loads, for example, the wave number of a gear and the gear ratio are related to these frequencies. Depending on the depth of an abnormality or failure, there are various possibilities on how the frequency fluctuates. For example, state observation signal data 302 for the failure state indicates a possibility of an amplitude of feature frequency f1 being larger than an amplitude of feature frequency f1 in state observation signal data 301 for the normal state. Further, for example, state observation signal data 303 for the failure state indicates a possibility of an amplitude of feature frequency f2 being larger than an amplitude of feature frequency f2 in state observation signal data 301 for the normal state. In addition, for example, state observation signal data 304 for the failure state indicates a possibility of modulation on feature frequency f1.

It is possible to derive the state observation signal data of such failure states when a failure actually occurs in the equipment. However, from the viewpoint of failure prediction, it is desired to estimate presence of signs of these possibilities before the failure occurs. For this reason, on the basis of the above findings, feature frequencies associated with parts of each equipment are acquired for each equipment from the equipment model in step S201.

Next, referring to FIG. 4, an exemplary equipment model in the embodiment of the present disclosure will be described in connection with step S201 of FIG. 2.

Figure 4:
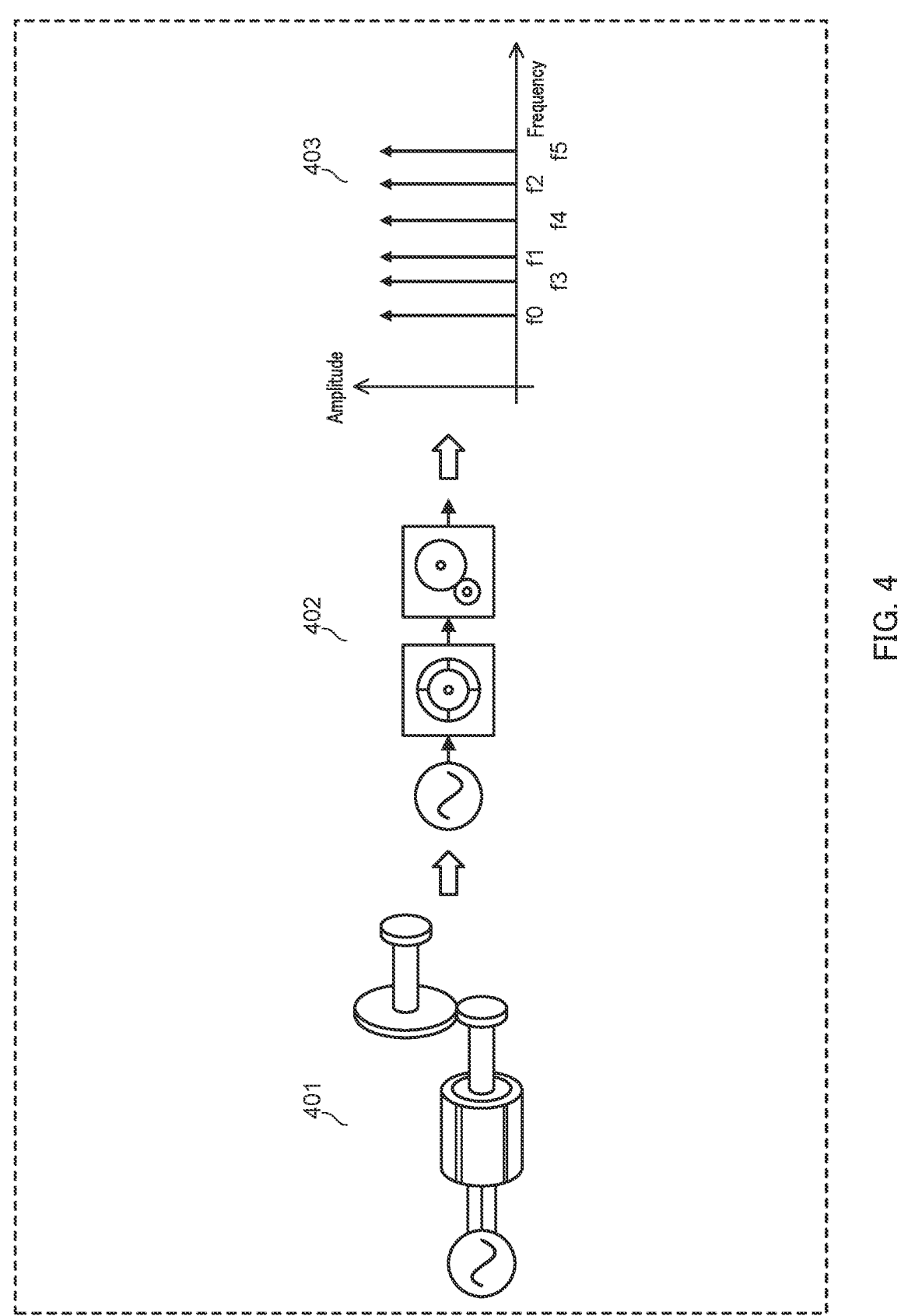
FIG. 4 illustrates one example of an equipment model in the embodiment of the present disclosure.

In FIG. 4, equipment 401 schematically illustrates equipment 101 including motor 102 and load 103, while equipment model 402 schematically illustrates equipment model 121 including motor model 122 and load model 123. Further, in FIG. 4, simulated state observation signal data 403 illustrates an example of the feature frequency derived from the equipment model.

In the present embodiment, in order to generate the training data as described above, simulator 114 estimates the feature frequency by performing a simulation using the equipment model modeling the equipment.

Simulator 114 first acquires structure information on the motor and the gear from design data, measurement data, and the like of equipment 401 via an input from a user of learning apparatus 150. Simulator 114 acquires, as such structure information, mechanical information such as a shape, a size, a mass, a material, a number of gears, and a gear ratio, and electromagnetic circuit information such as a power supply frequency, a number of slots of the motor, and a number of poles of the motor, for example.

Next, simulator 114 generates (acquires) the simulated state observation signal data by performing a simulation using equipment model 402 modeling these pieces of structure information using model parameters. For example, a load torque, electromagnetic torque, rotor current/electromotive force/magnetic flux density, stator current/electromotive force/magnetic flux density, moment of inertia, friction coefficient, rotation speed, and shaft frequency are used as the model parameters.

Simulator 114 acquires the simulated state observation signal data by simulating various operation states using equipment model 402. The accuracy of the simulated state observation signal data varies greatly depending on the level of detail of the simulation and the model (e.g., depending on the number of model parameters). However, regardless of such a level of detail, it is possible to estimate the feature frequency that is dependent on the structure. In the meantime, the amplitudes of respective feature frequencies depend on the states of respective parts, and therefore greatly depend on the simulation conditions and the level of detail.

The simulation with a high level of detail allows acquisition of the simulated state observation signal data accurate enough to reproduce the amplitude. On the other hand, a simulation with a low level of detail allows acquisition of the simulated state observation signal data in a short time. Simulated state observation signal data 403 in FIG. 4 illustrates one example of the signal data generated by a simulation with a low level of detail. In this example, feature frequencies are estimated.

In the embodiment illustrated in simulated state observation signal data 403 in FIG. 4, six feature frequencies f0 to f5 are estimated. Six feature frequencies f0 to f5 are associated respectively with parts of equipment 401, as described above. For example, f0 is the frequency associated with the power source, f1 is the frequency associated with the stator, and f2 is the frequency associated with the rotor. Further, for example, f3 is the frequency associated with a first gear, f4 is the frequency associated with a second gear, and f5 is the frequency associated with a third gear.

Next, simulator 114 stores, in feature frequency storage 115, the feature frequency of each structure of the equipment in the generated simulated state observation signal data. Thus, training data generator 117 is capable of acquiring the feature frequency for each structure of the equipment from feature frequency storage 115.

Next, referring to FIG. 5, one example of the amplitude-time fluctuations of the equipment harmonics in the embodiment of the present disclosure will be described in relation to step S203 of FIG. 2.

Figure 5:
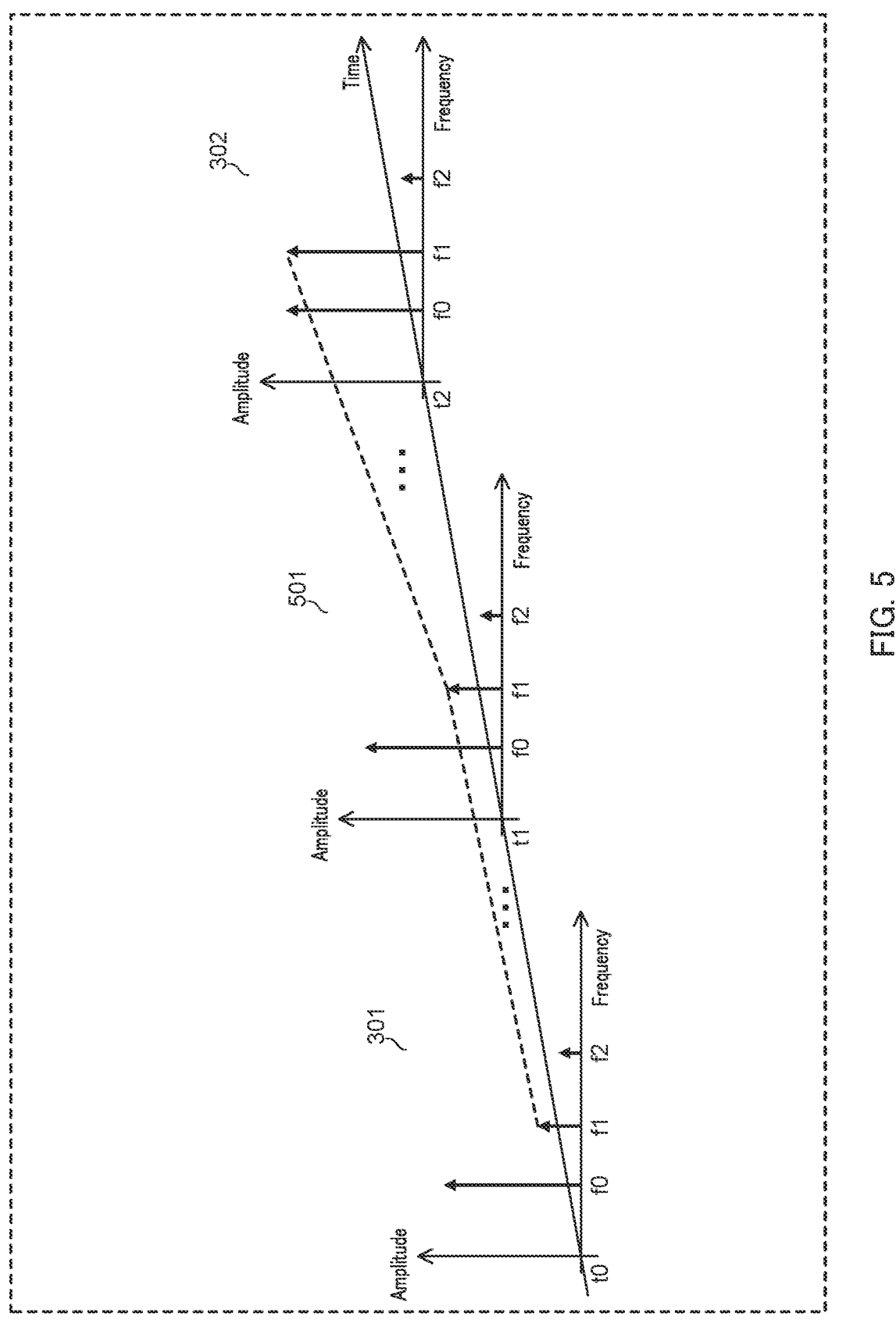
FIG. 5 illustrates one example of amplitude-time fluctuation of the equipment harmonic in the embodiment of the present disclosure.

In FIG. 5, state observation signal data 301 for the normal state represents the state at time t0 (e.g., current time). State observation signal data 302 for the failure state in which the amplitude of feature frequency f1 is larger represents the state at time t2 (for example, in the future). Failure prediction system 100 determines which of the states at time points of time t0<t1<t2 the state observation signal data indicating the operation state of the equipment in operation is close to. To this end, learning apparatus 150 extracts amplitude-time fluctuation pattern 501 of feature frequency f1 from the past history of the state observation signal data, and performs extrapolation to predict amplitude-time fluctuation pattern 501. Learning apparatus 150 uses the training data for learning such that the state observation signal data at time t1 can be classified. Further, since such an amplitude-time fluctuation pattern differs for each equipment and for each part (feature frequency), learning apparatus 150 learns various amplitude-time fluctuation patterns.

Next, referring to FIG. 6, exemplary amplitude-time fluctuation patterns of the equipment harmonic in the embodiment of the present disclosure will be described in relation to step S203 of FIG. 2.

Figure 6:
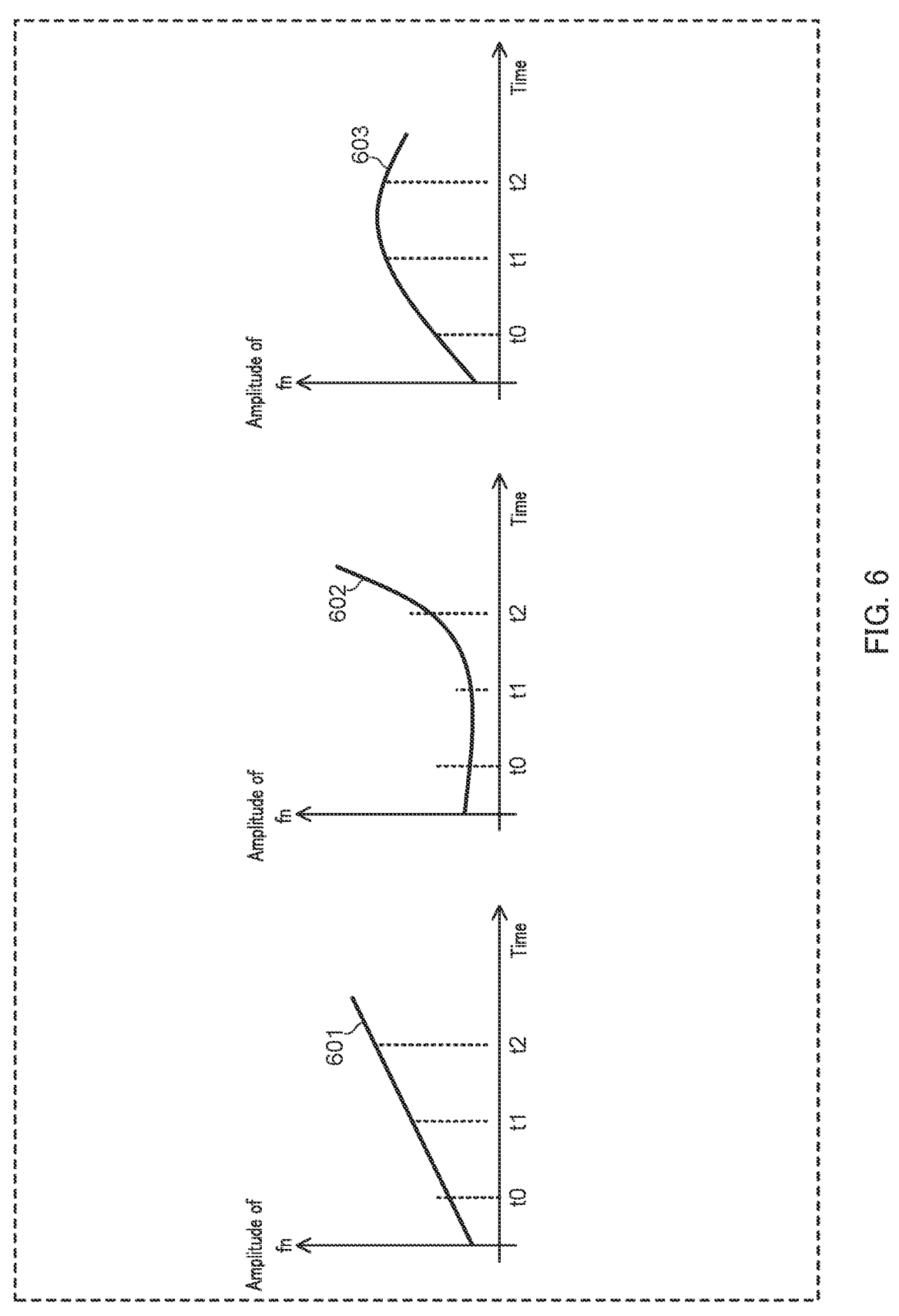
FIG. 6 illustrates an example of an amplitude-time fluctuation pattern of the equipment harmonic in the embodiment of the present disclosure.

In FIG. 6, amplitude-time fluctuation patterns 601 to 603 illustrate variation examples of the time fluctuation patterns with respect to the amplitude of any feature frequency. For example, amplitude-time fluctuation pattern 601 illustrates a pattern in which the amplitude linearly increases with time. For example, amplitude-time fluctuation pattern 602 illustrates a pattern of an exponential increase. Further, for example, amplitude-time fluctuation pattern 603 illustrates a pattern of a quadratic decrease.

Since it may be difficult to sufficiently acquire these time fluctuation patterns in the simulation with equipment model 402 in FIG. 4, the time fluctuation patterns are extracted from the actual state observation signal data in the embodiment of the present disclosure. Learning apparatus 150 is capable of simulating possibilities of diverse fluctuations by extracting the amplitude-time fluctuation patterns separate for each equipment or each feature frequency and applying the amplitude-time fluctuation patterns to the simulation. It is thus possible for learning apparatus 150 to learn various amplitude-time fluctuation patterns. In the following, the learning of such diverse amplitude-time fluctuation patterns will be described.

Figure 7:
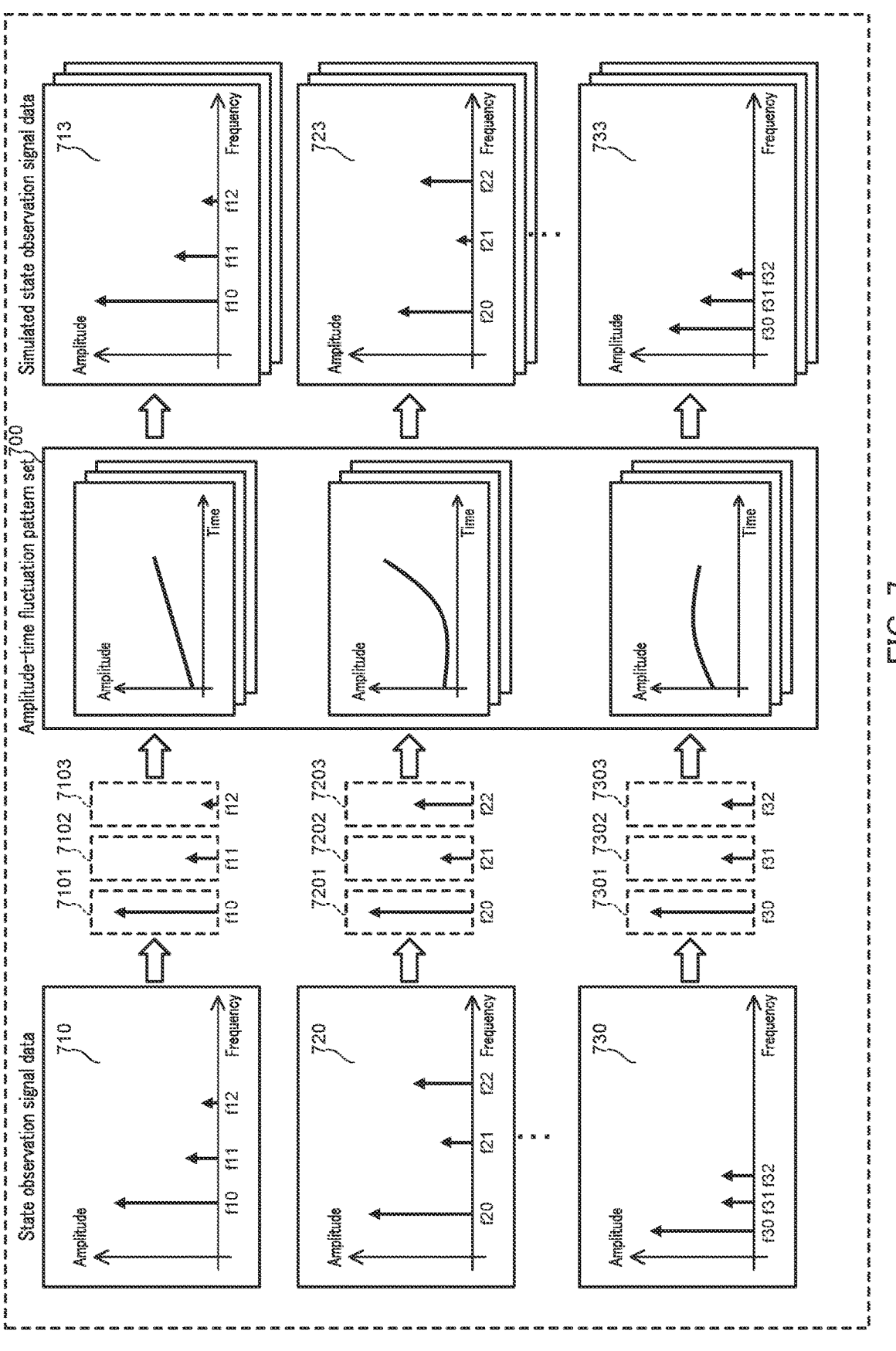
FIG. 7 illustrates one example of training data generation in the embodiment of the present disclosure.

Referring now to FIG. 7, one example of training data generation in the embodiment of the present disclosure will be described in connection with step S204 and step S205 of FIG. 2.

To begin with, state observation signal data 710, 720, 730, and the like for the normal state of M pieces of equipment up to the current time are expressed as

[1]

$$S_m(t), m = 1 \ldots M. \qquad \text{(Expression 1)}$$

When these state observation signal data are divided into feature frequencies obtained from corresponding equipment models, these state observation signal data can be expressed as

[2]

$$S_m(t) = \sum_n^{N_m} a_{mn}(t) f_{nm}(t). \qquad \text{(Expression 2)}$$

Here, $n=1 \ldots N_m$ represents a feature frequency index of equipment m, $a_{mn}(t)$ represents the amplitude-time fluctuation of feature frequency n of equipment m, and $f_{mn}(t)$ represents feature frequency n of equipment m. For example, as illustrated in FIG. 7, there are frequency f10 (7101), frequency f11 (7102), and frequency f12 (7103) as feature frequencies of equipment 1. Similarly, as illustrated in FIG. 7, there are frequency f20 (7201), frequency f21 (7202), and frequency f22 (7203), and frequency f30 (7301), frequency f31 (7302), and frequency f32 (7303) as feature frequencies of another piece of equipment.

When Expression 1 is a vector expression of a composite function, Expression 1 can be expressed as

[3]

$$a_m \left[ a_{m0}, a_{m1}, \ldots, a_{mN_m} \right] \qquad \text{(Expression 3)}$$
$$f_m = \left[ f_{m0}, f_{m1}, \ldots, f_{mN_m} \right]^T$$
$$S_m(t) = a_m f_m(t).$$

Amplitude-time fluctuation pattern set 700 obtained by collecting the amplitude-time fluctuation patterns extracted from M pieces of equipment is expressed as

[4]

$$A = \{a_{mn}\}, m = 1 \ldots M, n = 1 \ldots N_m. \qquad \text{(Expression 4)}$$

Training data generator 117 generates training data related to the virtual failure part (associated with feature frequency n) of equipment m from amplitude-time fluctuation pattern set 700. Specifically, the training data is generated as follows.

Training data generator 117 extracts, from amplitude-time fluctuation pattern set 700, any amplitude-time fluctuation pattern as given by

[5]

$$a'_i \in A. \qquad \text{(Expression 5)}$$

Subsequently, training data generator 117 selects, from the above-mentioned amplitude-time fluctuation pattern vector of equipment m as given by Expression 6, any feature frequency n supposed to correspond to the virtual failure part, and generates the vector as given by Expression 9 in which amplitude-time fluctuation pattern $a_{mn}$ of the feature frequency is replaced with the amplitude-time fluctuation pattern given by Expression 8 multiplied by any gain given by Expression 7.

[6]

$$a_m \left[ a_{m0}, \ldots, a_{mn-1}, a_{mn}, a_{mn+1}, \ldots, a_{mN_m} \right] \qquad \text{(Expression 6)}$$

-continued

[7]

$$g \qquad \text{(Expression 7)}$$

[8]

$$a'_i \qquad \text{(Expression 8)}$$

[9]

$$a'_{mn} = \left[ a_{m0}, \ldots, a_{mn-1}, g a'_i, a_{mn+1}, \ldots, a_{mN_m} \right] \qquad \text{(Expression 9)}$$

Here, the above gain is a factor set for acceleration toward the failure state.

Subsequently, training data generator 117 generates the simulated state observation signal data for any future time $t_k$ as given by Expression 10 by extrapolating the amplitude-time fluctuation.

[10]

$$S'_{mn}(t_k) = a'_{mn} f_m(t_k) \qquad \text{(Expression 10)}$$

For example, FIG. 7 illustrates simulated state observation signal data 713 in which the amplitude-time fluctuation of feature frequency f10 of equipment 1 is extrapolated, simulated state observation signal data 723 in which the amplitude-time fluctuation of feature frequency f21 of equipment 2 is extrapolated, and simulated state observation signal data 733 in which the amplitude-time fluctuation of feature frequency f31 of equipment 3 is extrapolated.

Training data generator 117 repeats the above-described processing to generate set $D_m$ of training data for equipment m given by Expression 12, in which the simulated state observation signal data as given by Expression 11 that is input data, frequency label n that indicates which feature frequency has been changed and that represents the feature frequency associated with the virtual failure part, and time point label $t_k$ representing an elapsed time from the current time point (during learning) are combined as a set.

[11]

$$S'_{mn}(t_k) \qquad \text{(Expression 11)}$$

[12]

$$D_m = \{ (S'_{mn}(t_k), n, t_k) \} \qquad \text{(Expression 12)}$$

Training data generator 117 sets the amplitude of the feature frequency and time point t2 for the failure state of the virtual failure part as follows.

When simulator 114 has performed a simulation with a high level of detail using the equipment model, training data generator 117 sets the amplitude of the feature frequency and the time point for the failure state obtained as a result of this simulation to the amplitude of the feature frequency and time point t2 for the failure state of the virtual failure part, respectively. When extrapolating the amplitude-time fluctuation, training data generator 117 may extrapolate the amplitude-time fluctuation such that the amplitude-time fluctuation converges to the simulated state observation signal data acquired by the simulation of the failure state. Such a simulation with a high level of detail includes, for example, performing a simulation by taking the actual failure part into the equipment model as a shape or a parameter change using CAD or the like, performing a
simulation by adding a detailed parameter change to a part
where a failure is assumed, and the like. In this case, the
training data can be generated so as to converge to the failure
state simulated by simulator 114. Further, training data
generator 117 may not only set the amplitude of the feature
frequency and the time point for the failure state acquired via
simulator 114, but also use, as input data of the training data,
the simulated state observation signal data itself generated
when simulator 114 performs the simulation with a high
level of detail.

When simulator 114 performs a simulation with a low
level of detail using the equipment model, or when the
feature frequency can be determined from the structural
parameters of the equipment without a simulation with a low
level of detail being performed by simulator 114, training
data generator 117 sets, for example, the amplitude of the
feature frequency input in advance by the user of learning
apparatus 150 as the amplitude of the feature frequency for
the failure state of the virtual failure part, and sets the time
point corresponding to the amplitude of the set feature
frequency as time point t2 for the failure state of the virtual
failure part.

When replacing elements (amplitude-time fluctuation pat-
terns) of the amplitude-time fluctuation pattern vector, train-
ing data generator 117 may select a plurality of feature
frequencies associated respectively with a plurality of virtual
failure parts, and may replace a plurality of amplitude-time
fluctuation patterns. It is thus possible to generate the
training data taking into consideration the possibility that a
plurality of virtual failure parts simultaneously fail.

Further, instead of replacing amplitude-time fluctuation
pattern $a_{mn}$ with any amplitude-time fluctuation pattern
multiplied by any gain, training data generator 117 may
perform the followings. Note that training data generator
117 may replace amplitude-time fluctuation pattern $a_{mn}$ with
an amplitude-time fluctuation pattern obtained by weighting
and combining amplitude-time fluctuation pattern $a_{mn}$
obtained based on the actual state observation signal data
generated by state observer 111 and the amplitude-time
fluctuation pattern obtained based on the simulated state
observation signal data obtained by the simulation using the
equipment model by simulator 114.

Here, the weighting may be set such that the weight of the
actual state observation signal data increases as the time
point approaches the current time, and the weight of the
simulated state observation signal data increases as the
future time point goes farther from the current time. For
example, the weight of the actual state observation signal
data may be set to be higher than the weight of the simulated
state observation signal data in the first half between current
time point t0 and time point t2 of the failure state, and the
weight of the simulated state observation signal data may be
set to be higher than the weight of the actual state observa-
tion signal data in the second half between current time point
t0 and time point t2 of the failure state.

Thus, the training data can be generated to smoothly
converge to the failure state obtained by the simulation.
Alternatively, if the state observation signal data of an actual
failure state of another piece of equipment or the like is
acquired by state observer 111, the weighting may be set so
that the weight of this state observation signal data is higher.
Thus, the training data can be generated so as to converge to
the actual failure state.

Further, if the state observation signal data of another
piece of equipment or the like up to its actual failure state is
acquired by state observer 111, training data generator 117 may set the amplitude of the feature frequency and time
point t2 for the failure state of the virtual failure part from
the state observation signal data up to the actual failure state,
or may use the state observation signal data itself up to the
actual failure state as the simulated state observation signal
data.

In the above description, time point label $t_k$ is described as
representing the elapsed time from current time point t0
(during learning), but the present embodiment is not limited
thereto, and time point label $t_k$ may be set to a value obtained
by subtracting, from time point t2 associated with the failure
state, the elapsed time from current time point t0.

<Variations>
Although FIG. 1 illustrates an example in which simulator
114 and equipment model 121 exist, it is possible to obtain
a desired effect in the present embodiment even when
simulator 114 and equipment model 121 do not exist. The
present variation corresponds to the case where the above-
described feature frequency can be determined from the
structural parameters of the equipment. In the present varia-
tion, the feature frequency is stored in feature frequency
storage 115 through, for example, an input process by the
user of learning apparatus 150. According to the present
variation, pattern extractor 116, training data generator 117,
and learner 118 perform the above processing using the
feature frequency stored in feature frequency storage 115
without the simulation being performed by simulator 114
using equipment model 121. It is thus possible to reduce the
processing load of learning apparatus 150.

(Effect of Learning Apparatus and Learning Method in
Embodiment)
Learning apparatus 150 and learning method 200 accord-
ing to the embodiment of the present disclosure have the
above-described configuration, and are thus capable of pre-
dicting the amplitude-time fluctuation pattern of the feature
frequency so as to generate the simulated state observation
signal data simulating the possibility of diverse fluctuations
at and after the current time point (or the specific time point
or the first time point) and generate the training data includ-
ing the simulated state observation signal data according to
individual equipment structures.

Here, the simulated state observation signal data includes
data of the amplitude of the feature frequency that clearly
indicates the failure state of the equipment. Therefore,
learning apparatus 150 is capable of easily acquiring the data
that indicates the failure state and that is used as the training
data, and performing learning for accurately determining the
failure state of the equipment. In addition, learning appara-
tus 150 and learning method 200 have the above-described
configuration, and thus make it possible to generate the
training data such that the training data converges to the
simulated failure state when the failure state is simulated
with a high level of detail. It is thus possible to perform
learning for more accurate determination of the failure state
of the equipment.

Figure 8:
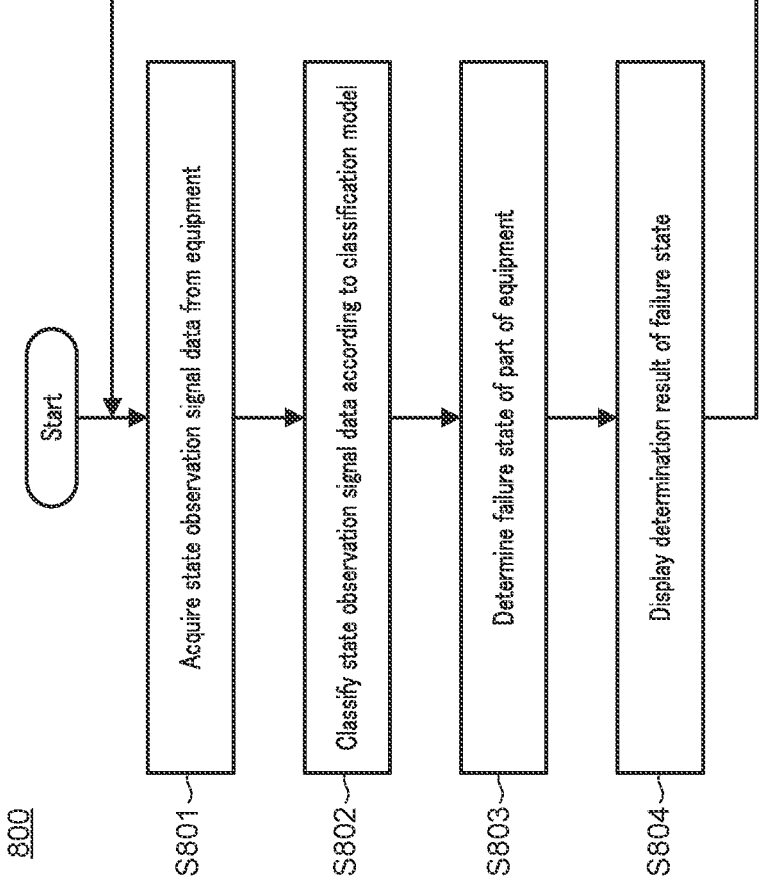
FIG. 8 is a flowchart illustrating one example of a failure prediction method according to an embodiment of the present disclosure.

<Failure Prediction Method>
Next, one example of failure prediction method 800
according to the embodiment of the present disclosure will
be described with reference to FIG. 8. Failure prediction
method 800 is performed by failure prediction system 100.

In step S801, state observer 111 receives a sensing signal
from sensor 110 sensing the state of the equipment, and
performs the above-described preprocessing on the sensing
signal to generate state observation signal data indicating the
operation state of the equipment in operation. In step S801,
state observer 111 may acquire, from the equipment, the
state observation signal data indicating the operation state of the equipment in operation via sensor 110. Then, state observer 111 outputs the acquired state observation signal data to state determiner 112.

In step S802, state determiner 112 classifies the state observation signal data outputted from state observer 111 according to the classification model generated by learner 118 in step S205 of learning method 200 and stored in model storage 119. Specifically, state determiner 112 calculates (acquires) the similarity or probability between the state observation signal data and the simulated state observation signal data in accordance with the classification model, and classifies the state observation signal as belonging to the amplitude-time fluctuation pattern associated with the simulated state observation signal data having the closest similarity or highest probability.

In step S803, state determiner 112 determines the failure state (failure possibility) of each part from a label associated with the simulated state observation signal data having the closest similarity degree or the highest probability. The specific determination is as follows. When the label is of the feature frequency, state determiner 112 refers to feature frequency storage 115 to determine the failure part corresponding to the feature frequency (frequency label). When the label is of the time point, state determiner 112 determines the predicted time to be taken until the failure part fails, from the corresponding amplitude-time fluctuation pattern, specifically, by subtracting time point label $t_k$ from time point t2 associated with the failure state.

It should be noted that time point label $t_k$ itself corresponds to the predicted time to be taken until the failure part fails, when time point label $t_k$ is set to a value obtained by subtracting, from time point t2 associated with the failure state, the elapsed time from the current time point (or the specified time point or the first time point) t0 during learning. As described above, state determiner 112 is capable of determining the failure state of each part using the current state observation signal data indicating the current operation state of the equipment and the classification model.

In step S804, display 113 displays the determination result of the failure state determined by state determiner 112 in step S803. Specifically, display 113 displays, to the user, the determined failure part and the predicted time to be taken until the failure part fails.

Failure prediction system 100 repeats the above steps to perform failure prediction and failure determination, and displays the failure prediction and failure determination to the user.

Note that the failure state determined by state determiner 112 and displayed by display 113 may be not only a failure state related to the simulated state observation signal data having the closest similarity or the highest probability, but also a failure state related to a predetermined number of pieces of simulated state observation signal data in descending order of similarity or in descending order of probability.

<Failure Prediction Display>

Figure 9:
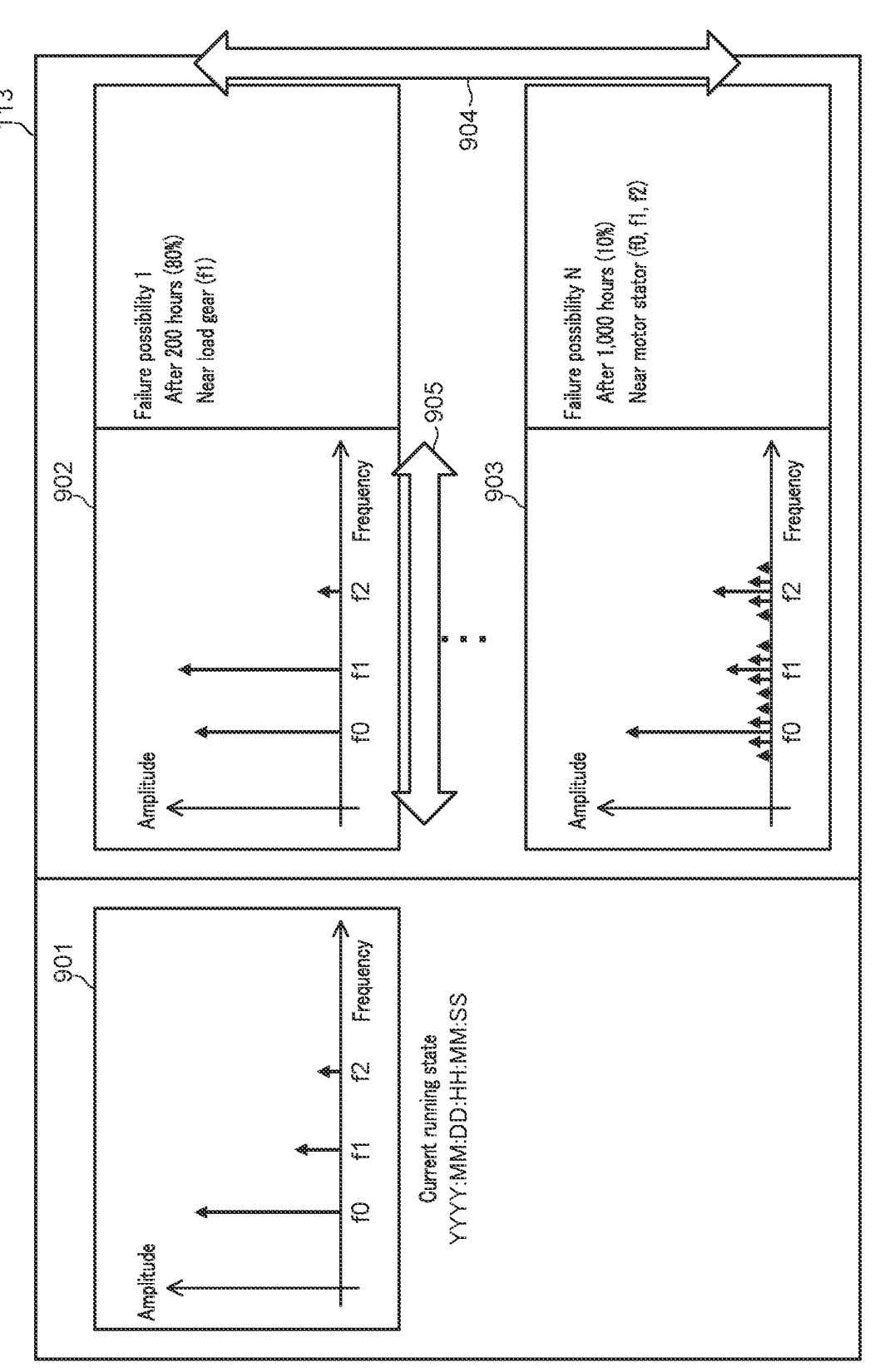
FIG. 9 illustrates one example of a failure prediction display according to an embodiment of the present disclosure.

Next, one example of a failure prediction display according to the embodiment of the present disclosure will be described with reference to FIG. 9. FIG. 9 illustrates one example of the failure prediction display according to the embodiment of the present disclosure.

In step S804 of failure prediction method 800, display 113 displays not only current state observation signal data 901 but also simulated state observation signal data 902 and 903 which serves as the basis for the determination of the current state observation signal data, as illustrated in FIG. 9. Further, display 113 displays simulated state observation signal data 902 and 903 in descending order of similarity or probability.

Further, as indicated by vertical arrow 904 in FIG. 9, the display area of the simulated state observation signal data may be a user interface allowing scrolling such that determination results of failure states of a plurality of parts can be displayed. This makes it possible to compare the possibilities of a plurality of pieces of simulated state observation signal data.

Further, as indicated by horizontal arrow 905 in FIG. 9, display 113 may change the time point of the simulated state observation signal data and display the simulated state observation signal data in response to a lateral scroll instruction by the user to display the amplitude-time fluctuation of the feature frequency. For example, display 113 may display the simulated state observation signal data of the instructed time point by putting the simulation time point backward in response to a leftward scroll instruction and putting the simulation time point forward in response to a rightward scroll instruction. Thus, it is possible to present to the user how the simulated state observation signal data fluctuates and reaches the failure state. In addition, in response to the leftward scroll instruction, display 113 may display the current state observation signal data and even the past state observation signal data in addition to the simulated state observation signal data.

(Effect of Failure Prediction System and Failure Prediction Method in Embodiment)

In addition to the effects of learning apparatus 150 and learning method 200, failure prediction system 100 and failure prediction method 800 according to the embodiments of the present disclosure have the above-described configuration, and are thus capable of accurately determining the failure state of the equipment using the classification model generated by learning apparatus 150. In addition, failure prediction system 100 and failure prediction method 800 have the above-described configuration, and are thus capable of displaying, to the user, the simulated state observation signal data having a similarity close to the current state observation signal or having a high probability, so as to make it possible for the user to judge the basis of the determination and the reliability of the failure prediction.

In the above-described embodiments, the expression "section" used for the components may be replaced with another expression such as "circuit (circuitry)," "assembly," "device," "unit," or "module."

Although the embodiments have been described above with reference to the drawings, the present disclosure is not limited to these examples. Obviously, a person skilled in the art would arrive variations and modification examples within a scope described in claims. It is understood that these variations and modifications are within the technical scope of the present disclosure. Moreover, any combination of features of the above-mentioned embodiments may be made without departing from the spirit of the disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

SUMMARY OF DISCLOSURE

A learning apparatus according to one exemplary embodiment of the present disclosure includes: a pattern extractor that extracts a time fluctuation pattern of an amplitude of a feature frequency from state observation signal data up to a first time point, the state observation signal data indicating an operation state of equipment, the feature frequency being associated with a part of the equipment; a training data generator that generates, based on the time fluctuation pattern of the amplitude of the feature frequency, simulated state observation signal data representing the time fluctuation pattern of the amplitude of the feature frequency at and after the first time point, and generates training data including the simulated state observation signal data; and a learner that generates a classification model for determination of a failure state of the part of the equipment using the training data.

In the above-described learning apparatus, the training data generator generates the training data in which the simulated state observation signal data, a frequency label representing the feature frequency, and a time point label representing an elapsed time from the first time point are combined as a set.

In the above-described learning apparatus, the training data generator generates the simulated state observation signal data by performing extrapolation of the time fluctuation pattern of the amplitude extracted from the state observation signal data up to the first time point.

The above-described learning apparatus further includes a simulator that estimates the feature frequency by performing a simulation using an equipment model modeling the equipment.

In the above-described learning apparatus, when the simulator simulates the failure state of the part of the equipment using the equipment model modeling the equipment, the training data generator generates the training data such that the training data converges to the simulated failure state of the part of the equipment.

A learning method according to one exemplary embodiment of the present disclosure is performed by a learning apparatus, the learning method including: extracting a time fluctuation pattern of an amplitude of a feature frequency from state observation signal data up to a first time point, the state observation signal data indicating an operation state of equipment, the feature frequency being associated with a part of the equipment; generating, based on the time fluctuation pattern of the amplitude of the feature frequency, simulated state observation signal data representing the time fluctuation pattern of the amplitude of the feature frequency at and after the first time point; generating training data including the simulated state observation signal data; and generating a classification model for determination of a failure state of the part of the equipment using the training data.

A failure prediction system according to one exemplary embodiment of the present disclosure includes the above-described learning apparatus, and a state determiner that determines the failure state of the part of the equipment using current state observation signal data indicating a current operation state of the equipment and the classification model.

The above-described failure prediction system further includes a display that displays a determination result of the failure state of the part of the equipment.

In the above-described failure prediction system, the display displays a time fluctuation of the amplitude of the feature frequency.

In the above-described failure prediction system, the part of the equipment includes a plurality of the parts of the equipment and the feature frequency includes a plurality of the feature frequencies, and the display displays determination results of failure states of the plurality of parts of the equipment.

The disclosure of Japanese Patent Application No. 2020-198545, filed on Nov. 30, 2020, including the specification, drawings and abstract, is incorporated herein by reference in its entirety.

INDUSTRIAL APPLICABILITY

One exemplary embodiment of the present disclosure is useful for failure prediction systems.

REFERENCE SIGNS LIST

100 Failure prediction system
101 Equipment
110 Sensor
111 State observer
112 State determiner
113 Display
114 Simulator
115 Feature frequency storage
116 Pattern extractor
117 Training data generator
118 Learner
119 Model storage
121 Equipment model
150 Learning apparatus

The invention claimed is:

1. A learning apparatus, comprising:

a pattern extractor that extracts a time fluctuation pattern of an amplitude of a feature frequency from state observation signal data up to a first time point, the state observation signal data indicating an operation state of equipment, the feature frequency being associated with a part of the equipment;

a training data generator that generates, based on the time fluctuation pattern of the amplitude of the feature frequency, simulated state observation signal data representing the time fluctuation pattern of the amplitude of the feature frequency at and after the first time point, and generates training data including the simulated state observation signal data; and a learner that generates a classification model for determination of a failure state of the part of the equipment using the training data.

2. The learning apparatus according to claim 1, wherein the training data generator generates the training data in which the simulated state observation signal data, a frequency label representing the feature frequency, and a time point label representing an elapsed time from the first time point are combined as a set.

3. The learning apparatus according to claim 1, wherein the training data generator generates the simulated state observation signal data by performing extrapolation of the time fluctuation pattern of the amplitude extracted from the state observation signal data up to the first time point.

4. The learning apparatus according to claim 1, further comprising:

a simulator that estimates the feature frequency by performing a simulation using an equipment model modeling the equipment.

5. The learning apparatus according to claim 4, wherein when the simulator simulates the failure state of the part of the equipment using the equipment model modeling the equipment, the training data generator generates the training data such that the training data converges to the simulated failure state of the part of the equipment.

6. A learning method performed by a learning apparatus, the learning method comprising:

extracting a time fluctuation pattern of an amplitude of a feature frequency from state observation signal data up to a first time point, the state observation signal data indicating an operation state of equipment, the feature frequency being associated with a part of the equipment;

generating, based on the time fluctuation pattern of the amplitude of the feature frequency, simulated state observation signal data representing the time fluctuation pattern of the amplitude of the feature frequency at and after the first time point;

generating training data including the simulated state observation signal data; and generating a classification model for determination of a failure state of the part of the equipment using the training data.

7. A failure prediction system, comprising:

a learning apparatus according to claim 1; and a state determiner that determines the failure state of the part of the equipment using current state observation signal data indicating a current operation state of the equipment and the classification model.

8. The failure prediction system according to claim 7, further comprising:

a display that displays a determination result of the failure state of the part of the equipment.

9. The failure prediction system according to claim 8, wherein the display displays a time fluctuation of the amplitude of the feature frequency.

10. The failure prediction system according to claim 8, wherein:

the part of the equipment comprises a plurality of the parts of the equipment and the feature frequency comprises a plurality of the feature frequencies, and the display displays determination results of failure states of the plurality of parts of the equipment.

* * * * *